United States Patent
Kraft et al.

(10) Patent No.: US 12,327,229 B2
(45) Date of Patent: Jun. 10, 2025

(54) SELF SERVICE TERMINAL WITH MAGNETIC CARD READER AND OPTICAL SCANNER

(71) Applicant: Diebold Nixdorf, Incorporated, North Canton, OH (US)

(72) Inventors: Dave Kraft, Uniontown, OH (US); Marcelo Soares de Castro, Canton, OH (US); Andrea Carozzi, Delbrueck (DE)

(73) Assignee: Diebold Nixdorf, Incorporated, North Canton, OH (US)

( * ) Notice: Subject to any disclaimer, the term of this patent is extended or adjusted under 35 U.S.C. 154(b) by 1092 days.

(21) Appl. No.: 16/982,668

(22) PCT Filed: Mar. 21, 2019

(86) PCT No.: PCT/US2019/023392
§ 371 (c)(1),
(2) Date: Sep. 21, 2020

(87) PCT Pub. No.: WO2019/183370
PCT Pub. Date: Sep. 26, 2019

(65) Prior Publication Data
US 2021/0019719 A1    Jan. 21, 2021

Related U.S. Application Data

(60) Provisional application No. 62/646,118, filed on Mar. 21, 2018.

(51) Int. Cl.
*G06Q 20/18*    (2012.01)
*G06K 7/00*    (2006.01)
(Continued)

(52) U.S. Cl.
CPC ........... *G06Q 20/18* (2013.01); *G06K 7/0021* (2013.01); *G06K 7/087* (2013.01); *G06K 7/1417* (2013.01)

(58) Field of Classification Search
CPC ...... G06Q 20/18; G06K 7/0021; G06K 7/087; G06K 7/1417; G07F 19/2055
See application file for complete search history.

(56) References Cited

U.S. PATENT DOCUMENTS

2006/0131389 A1   6/2006  Kwon
2010/0124312 A1*  5/2010  Enomoto ............... A61B 6/032
                                                 378/21
(Continued)

FOREIGN PATENT DOCUMENTS

DE    102008037773 A1    2/2010
EP        0854461 A2 *   7/1998  ............. G07F 19/00

OTHER PUBLICATIONS

International Preliminary Report on Patentability filed in corresponding PCT application; 8 pages.
(Continued)

*Primary Examiner* — Matthew Mikels
(74) *Attorney, Agent, or Firm* — Black McCuskey

(57) ABSTRACT

A self-service terminal can include a computing device, a display, a transceiver, a card module, an optical scanner, and a radiation source. The display can be in communication with the computing device and be controlled by the computing device. The computing device can be configured to transmit and receive data through the transceiver. The card module can have an intake and card reader configured to read a chip or a magnetic strip. At least part of a path of movement of the card through the self-service terminal can be defined by the card module. The scanner can be positioned on a first side of the path to capture an image of a first (Continued)

side of the card. The radiation source can emit radiation at an area of the card when the image is being captured.

20 Claims, 9 Drawing Sheets

(51) Int. Cl.
*G06K 7/08* (2006.01)
*G06K 7/14* (2006.01)

(56) References Cited

U.S. PATENT DOCUMENTS

2014/0372305 A1 12/2014 Ray
2015/0287289 A1 10/2015 Lewis

OTHER PUBLICATIONS

International Search Report filed in corresponding PCT application; 4 pages.
Written Opinion of the International Searching Authority filed in corresponding PCT application; 7 pages.

\* cited by examiner

SELF SERVICE TERMINAL WITH MAGNETIC CARD READER AND OPTICAL SCANNER

CROSS-REFERENCE TO RELATED APPLICATIONS

This application claims the benefit of U.S. Provisional Patent Application Ser. No. 62/646,118 for a SELF SERVICE TERMINAL WITH MAGNETIC CARD READER AND OPTICAL SCANNER, filed on Mar. 21, 2018, which is hereby incorporated by reference in its entirety. This application is a National Phase filing of International Application PCT/US2019/023392, for a SELF SERVICE TERMINAL WITH MAGNETIC CARD READER AND OPTICAL SCANNER, filed Mar. 21, 2019, which is hereby incorporated by reference in its entirety.

BACKGROUND

This relates in general to self-service terminals (SSTs). SSTs can be utilized by a user to carry out a transaction. The transaction may involve the SST dispensing one or more articles to the user or may involve the user depositing one or more articles with the SST. One example of an SST is an Automated Teller Machine or Automated Transaction Machine (ATM). ATMs are used by bank account holders to withdraw currency or bank notes or to make deposits of such notes. Often, in order to initiate an exchange at the SST, the user must be authenticated. This process can include the user presenting a token in the form of a bank card and entering a personal identification number (PIN). This process is prone to error and entails a security risk.

U.S. Pub. No. 2006/0131389 discloses a DATA CARD AUTHENTICATION SYSTEM AND METHOD which provides a method and an apparatus for authenticating a data card. The method for authenticating a data card having data storage comprises the steps capturing an image of the data card and comparing the image with a predetermined image to authenticate the data card. Alternatively, the method for authenticating comprises the step of receiving the data card to determine whether embossed data is present on the data card. Often, counterfeit data cards are merely cards with the data storage reprogrammed for access. By performing an image comparison between a valid card image and the incoming card image or a check for presence of embossment, counterfeit data cards are discoverable.

U.S. Pub. No. 2014/0372305 discloses DETECTING UNAUTHORIZED CARD SKIMMERS. In an example embodiment, an automated banking machine that includes an anti-fraud arrangement that can deter effective operation of unauthorized devices attached to the machine. The arrangement allows for the machine's card slot bezel to be frequently exchanged for a differently configured card slot bezel, where the bezel configuration is displayed to a potential user.

U.S. Pub. No. 2015/0287289 discloses a BANKING MACHINE CONTROLLED RESPONSIVE TO DATA READ FROM DATA BEARING RECORDS. The banking system operates responsive to data read from data bearing records. The system includes an automated banking machine comprising a card reader. The card reader includes a movable read head that can read card data along a magnetic stripe of a card that was inserted long-edge first. The card reader includes a card entry gate. The gate is opened for a card that is determined to be properly oriented for data reading. The card reader can encrypt card data, including account data. The card data is usable by the machine to authorize a user to carry out a financial transfer involving the account.

DE102008037773 discloses a self-service device i.e. automated teller machine, for dispensing cash in bank, with a control panel with magnetic card reader and detection device for optical detection of a surface of a magnetic card. The device has a control unit, a control panel with a magnetic card reader and an detection device for optical detection of surface of a magnetic card. The detection device is designed as a camera or a optical sensor, and provided in the magnetic card reader. A data storage unit is connected with the detection device, and an image processing device is connected with the detection device and/or the control unit. The control panel is arranged at a front side of a housing. An independent claim is also included for a method for detecting an operation of a manipulated magnetic card in a self-service device.

SUMMARY

A self-service terminal can include a computing device, a display, a transceiver, a card module, at least one optical scanner, and at least one radiation source. The computing device can have one or more processors. The display can be in communication with the computing device, wherein indicia displayed by the display can be controlled by the computing device. The transceiver can be in communication with the computing device, wherein the computing device can be configured to transmit data remotely through the transceiver and can receive data through the transceiver. The card module can have an intake configured to receive a card and at least one card reader configured to read one of a chip embedded in the card and a magnetic strip of the card. At least part of a path of movement of the card through the self-service terminal can be defined by the card module. The at least one optical scanner can be positioned on a first side of the path of movement to capture an image of a first side of the card. The at least one radiation source can be directed at the first side of the path and can be configured to emit radiation at an area of the card when the image is being captured.

According to other features, the at least one radiation source can be moveable relative to the path. The at least one optical scanner can be further defined as a first optical scanner positioned on the first side of the path to capture the image of the first side the card and a second optical scanner positioned on a second side of the path opposite the first side of the path to capture an image of a second side the card opposite the first side of the card. The at least one radiation source can be further defined as a first radiation source directed at the first side of the path and a second radiation source directed at a second side of the path.

In other features, the at least one radiation source can be further defined as configured to emit visible light, ultraviolet light, or infrared light. The at least one radiation source can be further defined as a first radiation source directed at the first side of the path and positioned on a first side of the first optical scanner and a second radiation source directed at the first side of the path and positioned on a second side of the first optical scanner opposite the first side of the optical scanner whereby the first optical scanner is positioned between the first radiation source and the second radiation source.

According to additional features, the at least one radiation source can be further defined as a plurality of radiation sources controlled by the computing device and configured to respectively emit light at one or more areas of the card when the at least one optical scanner is capturing the image of the first side of the card. The at least one radiation source can be further defined as a first radiation source directed at the first side of the path of movement of the card and a second radiation source directed at a second side of the path of movement of the card, wherein both of the first radiation source and the second radiation source are moveable relative to the path. The at least one optical scanner can be further defined as first and second optical scanners spaced from one another along the path.

A method performed by a self-service terminal can include controlling, with a computing device of the self-service terminal having one or more processors, a display in communication with the computing device, to display indicia on the display of the self-service terminal. The method can also include transmitting, with a transceiver in communication with the computing device, data remotely from the self-service terminal. The method can also include receiving, with the computing device, data through the transceiver. The method can also include receiving a card through an intake of a card module of the self-service terminal. The method can also include reading at least one of a chip embedded in the card and a magnetic strip of the card with at least one card reader of the card module. The method can also include defining at least part of a path of movement of the card through the self-service terminal with the card module. The method can also include emitting radiation at an area of a first side of the card with at least one radiation source directed at a first side of the path of movement. The method can also include capturing an image of the first side the card with at least one optical scanner positioned on the first side of the path of movement during the emitting.

According to other features, the method can include moving the at least one radiation source relative to the path to direct radiation at the card from first and second positions that are different from one another. The method can include emitting radiation at an area of a second side of the card with at least one radiation source directed at the second side of the path of movement and capturing an image of the second side of the card opposite the first side of the card with at least one optical scanner positioned on a second side of the path of movement opposite the first side of the path of movement during the emitting radiation at the area of the second side of the card.

In other features, the emitting can be further defined as emitting radiation in the form of visible light at the area of the first side of the card with the at least one radiation source directed at the first side of the path. The emitting can be further defined as emitting radiation in the form of ultraviolet light at the area of the first side of the card with the at least one radiation source directed at the first side of the path. The emitting can be further defined as emitting radiation in the form of infrared light at the area of the first side of the card with the at least one radiation source directed at the first side of the path.

According to additional features, the method can include moving the at least one radiation source relative to the path of movement from a first position to a second position after the emitting radiation at the area of the first side of the card with the at least one radiation source; emitting radiation at the area of the first side of the card from the second position with the at least one radiation source directed at the first side of the path of movement after the moving; and capturing a second image of the first side the card with the at least one optical scanner positioned on the first side of the path of movement during the emitting radiation at the second area of the first side of the card with the at least one radiation source.

According to other features, the method can include emitting radiation at the area of the first side of the card with a second radiation source, that is distinct and physically spaced from the at least one radiation source and capturing a second image of the first side the card with at least one optical scanner positioned on the first side of the path of movement during the emitting radiation at the area of the first side of the card with the second radiation source. The method can include ceasing the emitting radiation at the area of the first side of the card with the at least one radiation source prior to the emitting radiation at the area of the first side of the card with the second radiation source.

In other features, the emitting radiation can be further defined as successively emitting radiation at the area of the first side of the card from a plurality of different positions and the capturing can be further defined as capturing successive images of the first side the card, at least one image captured for each of the plurality of different positions, with the at least one optical scanner.

Various aspects will become apparent to those skilled in the art from the following detailed description and the accompanying drawings.

DETAILED DESCRIPTION

Figure 1:
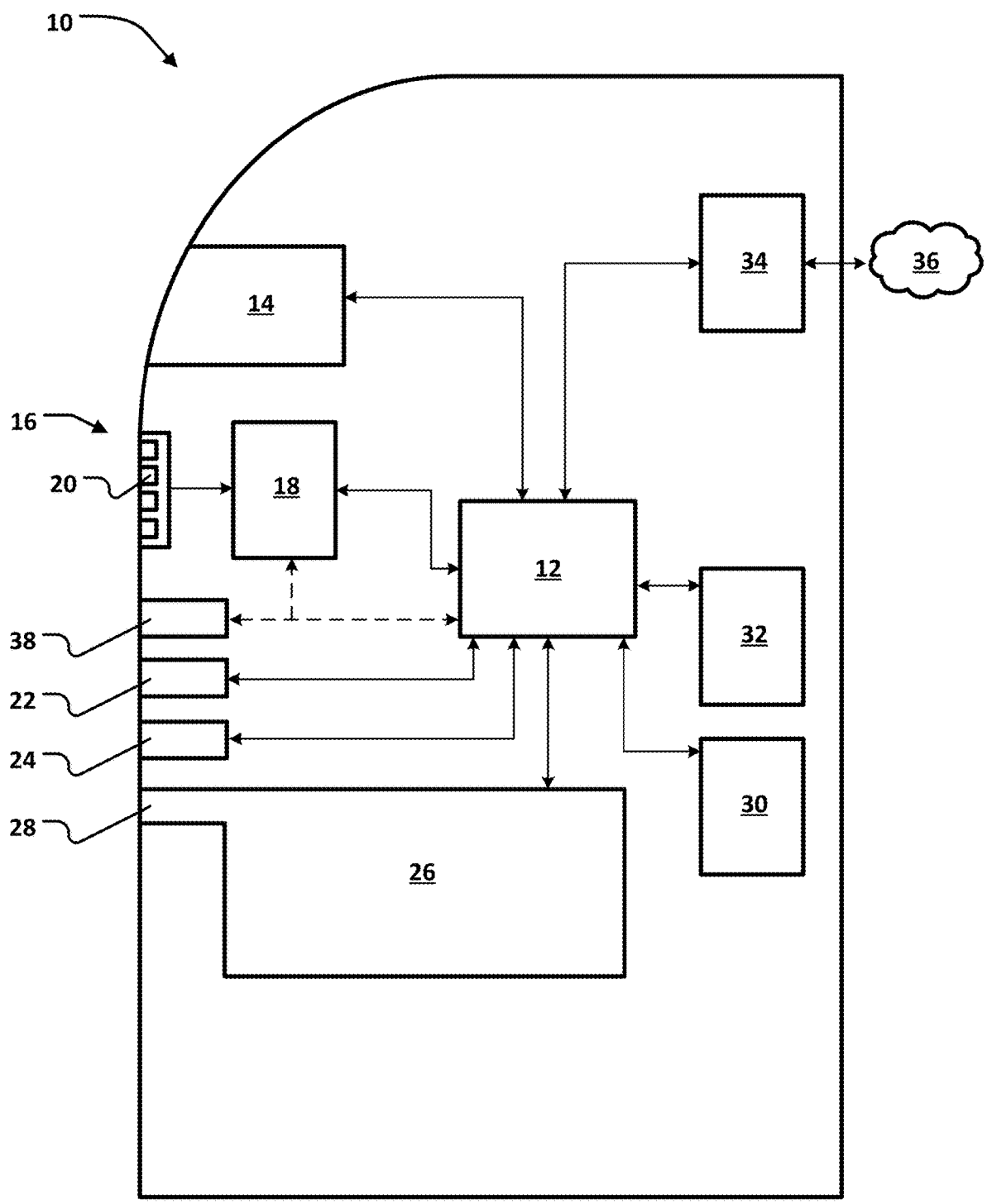
FIG. 1 is a functional block diagram of an exemplary ATM according to one or more implementations of the present disclosure.

A plurality of different embodiments of the present disclosure is shown in the Figures of the application. Similar features are shown in the various embodiments of the present disclosure. Similar features across different embodiments have been numbered with a common reference numeral and have been differentiated by an alphabetic suffix. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

The present disclosure provides an enhanced SST. One objective that can be realized by the present disclosure is the combination of a motorized card reader with an optical scanner to enhance authentication of a user and inhibit security risks. For example, a driving license can be received in the same slot that receives a bank card. The user of an SST can introduce the bank card in the motorized card reader to start a transaction. If the scanning of the driving license is required, the bank card can be returned, and the customer is requested to input his driving license in the same card reader. The driving license can then be transferred to an "optical reading station" (a camera for example) that takes a picture of the driving license and supply it to a PC of the SST or a remote server for further processing in order to approve a requested transaction. One alternative use of the feature of optical reading is the increased security about the authenticity of the bank card. In the well-known "skimming attacks," the magnetic information on a bank card is stolen and duplicated on a "clone card" with the scope to use such clone card to perform transactions. If a picture of the original card was taken and stored for reference on a server of the particular bank operating the SST, it will be easy to compare the picture taken by the optical scanner at the SST with a stored picture and block the transaction in case of a discrepancy. An additional use could be the implementation of a "two step" authorization, where both cards are used (bank card and driving license) to secure the identity of the user performing the transaction.

Referring now to the drawings, there is illustrated in FIG. 1 a functional block diagram of an exemplary ATM 10 according to one or more implementations of the present disclosure. It will be understood that embodiments of the present disclosure are applicable to other types of SSTs, such as vending machines and kiosks, by way of example and not limitation. The ATM 10 includes different structures and subsystems for executing and recording transactions. The ATM 10 includes a computing device 12. The exemplary computing device 12 has one or more processors and a non-transitory, computer readable medium. The computing device 12 operates under the control of an operating system, kernel and/or firmware and executes or otherwise relies upon various computer software applications, components, programs, objects, modules, data structures, etc. The exemplary computing device 12 can operate under the control of the Windows@ operating system. The computer readable medium (memory) of the computing device 12 can include random access memory (RAM) devices comprising the main storage of computing device 12, as well as any supplemental levels of memory, e.g., cache memories, non-volatile or backup memories (e.g., programmable or flash memories), read-only memories, etc. In addition, the memory may be considered to include memory storage physically located elsewhere in computing device 12, such as any cache memory in a processor, as well as any storage capacity used as a virtual memory. The computing device 12 can also include one or more mass storage devices, e.g., a floppy or other removable disk drive, a hard disk drive, a direct access storage device (DASD), an optical drive (e.g., a CD drive, a DVD drive, etc.), and/or a tape drive, among others.

The exemplary ATM 10 also includes a display 14. The computing device 12 can control the display 14 to present information to the user for furthering completion of the transaction. The display 14 can be a touch screen that allows the user to enter information through the display 14. The exemplary display 14 is configured to transmit any user-entered information to the computing device 12.

The exemplary ATM 10 also includes a key pad 16 and an encryption module 18. Generally, the combination of a key pad and an encryption module are referred to in the art as an encrypted pin pad (EPP). The exemplary key pad 16 includes a plurality of keys, such as key 20. The exemplary encryption module 18 has one or more processors and a non-transitory, computer readable medium. The user can press the keys of the key pad 16 to enter a pin. The key pad is placed in communication with the encryption module 18 and therefore the numbers of the pin are received by the encryption module 18. It is noted that the communication of the pin is direct and secure; the pin cannot be intercepted between the key pad 16 and the encryption module 18. The pin is then encrypted by the encryption module to define a pin block. The encryption module 18 includes a network encryption key and applies the network encryption key to encrypt the pin to a pin block. The exemplary encryption module 18 is configured to transmit the pin block to the computing device 12.

The exemplary ATM 10 also includes a card module 22. The card module 22 can receive a token from the user, such as a card. The card module 22 can be configured to execute read and write operations with respect to any storage medium fixed to the user's card. The exemplary card module 22 is configured to transmit any data read from the user's card to the computing device 12. The exemplary card module 22 can also be configured to receive commands and data from the computing device 12 and change data stored on the user's card.

The exemplary ATM 10 also includes a printer module 24. The computing device 12 can control the printer module 24 to print a receipt when a transaction has been completed. The printer module 24 can communicate one or more messages to the computing device 12, such as a maintenance message regarding the need to refill printer paper.

The exemplary ATM 10 also includes an article exchange unit 26. In the exemplary embodiment, the article exchange unit 26 is configured to receive and dispense items such as bank notes (cash) and checks. The exemplary article exchange unit 26 includes a slot 28 defined on an exterior of the ATM 10 for the passage of such items. In other embodiments of the present disclosure, an article exchange unit can be configured to facilitate the exchange of other items. The article exchange unit 26 can include one or more sensors and transmit signals from any such sensors to the computing device 12 to execute an exchange. The computing device 12 can control the article exchange unit 26 in response to such signals. For example, the article exchange unit 26 can include a sensor that detects receipt of an item such as a check. The article exchange unit 26 can include a further sensor in the form of a scanner that generates an image of the received item and transmits the image to the computing device 12. When an exchange involves the dispensation of an article to the user, the computing device 12 can control the article exchange unit 26 to dispense the item(s) requested by the user.

The exemplary ATM 10 also includes a printer module 30. The printer module 30 can generate a continuous record of all transactions executed by the ATM 10. The computing device 12 can control the printer module 30 to supplement the record after each transaction has been completed. The printer module 30 can communicate one or more messages to the computing device 12, such as a maintenance message regarding the need to refill printer paper.

The exemplary ATM 10 also includes an access module 32. The access module 32 can be positioned proximate to a rear side of the ATM 10. The access module 32 can be utilized for service and support technicians. For example, the access module 32 can be utilized by a field engineer to complete software updates to the computing device 12. The access module 32 can also be utilized when non-software updates and maintenance is performed, such as the refilling of printer paper or currency.

The exemplary ATM 10 also includes a transceiver 34. The exemplary transceiver 34 is configured to facilitate communication between the computing device 12 and other computing devices that are distinct from and physically remote from the computing device 12. An example of such a remote computing device is a server computing device, such as a banking server communicating with a plurality of ATMs. The exemplary transceiver 34 places the computing device 12 in communication with one or more networks, such as network 36. The network 36 can be a local area network (LAN), a wide area network (WAN) such as the Internet, or any combination thereof. The transceiver 34 can transmit data and requests for input generated by the computing device 12 and receive responses to these requests, directing these responses to the computing device 12.

The exemplary ATM 10 also includes a transceiver 38. The exemplary transceiver 38 is configured to facilitate communication between at least one of the encryption module 18 and the computing device 12 and other computing devices that are distinct from and physically proximate to the ATM 10. An example of such a proximate computing device is a smartphone possessed by the user. The dashed connection lines in FIG. 1 represents optional interconnections. The exemplary transceiver 38 can place the user's smartphone in communication with the encryption module 18, the computing device 12, or both. The exemplary transceiver 38 can implement various communication protocols. For example, the transceiver 38 can be a Near Field Communication (NFC) device. Alternatively, the transceiver 38 can be a Bluetooth beacon. The transceiver 38 can transmit and receive data and requests for input generated by the encryption module 18 and/or the computing device 12, such transmissions occurring with the user's smart phone for example.

Figure 2:
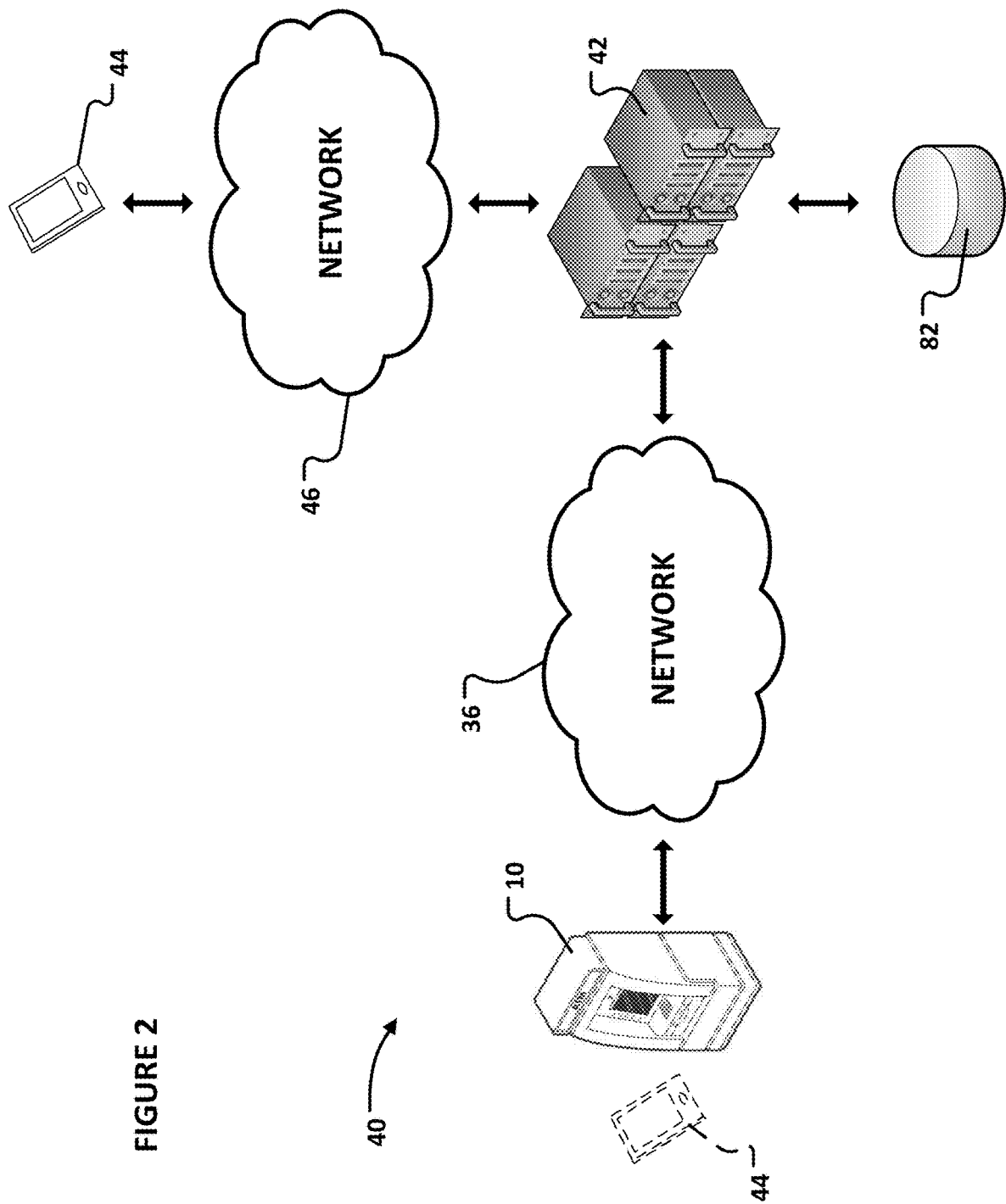
FIG. 2 is a functional block diagram of an exemplary system according to one or more implementations of the present disclosure.

The exemplary computing device 12 is thus configured to communicate with other computing devices. FIG. 2 is a functional block diagram of an exemplary system 40 according to one or more implementations of the present disclosure. An exemplary database of the system 40 is referenced at 82. The exemplary system 40 includes the ATM 10. The exemplary system 10 also includes a computing device 42, which is a server computing device in the exemplary embodiment of the present disclosure. The exemplary computing device 42 has one or more processors and a non-transitory, computer readable medium. The system 10 can be operated by a financial institution and the user can be an account holder of the financial institution.

The ATM 10 and the computing device 42 can communicate over the network 36. Transmissions over the network 36 may be encrypted and may include Message Authentication Codes (MACs) to enhance security. MACs are appended to messages sent from and received by a device such as the ATM 10. MACs verify that the messages sent and the messages received are identical and also confirm that messages originate from an approved source. The computing devices 12 and 42 can also apply Transport Layer Security (TLS) or Secure Sockets Layer (SSL) protocols and include respective firewalls to enhance security.

The exemplary system 40 can interact with a computing device possessed by a user. A computing device possessed by a user can be a smartphone, such as referenced at 44 in FIG. 2. The smartphone 44 can be operating at least partially under the control of the system 10. For example, the smartphone 44 can be operating a computer application (APP) at least partially controlled by the financial institution, such as a mobile banking APP. The APP, and thus the smartphone 44, can therefore be controlled in part by the computing device 42.

In operation, the exemplary system 40 can execute a transaction that is pre-staged and then completed at the ATM 10. For example, the user can communicate to the computing device 42 a desire to withdraw cash in the future. In FIG. 2, the smartphone 44 is shown in solid line during pre-staging and in dash line when the transaction is completed at the ATM 10. The communication for pre-staging can be generated using the mobile banking APP running on the computing device 44. The computing device 44 can communicate with the computing device 42 over a network 46. The network 46 can be a cellular phone network. The network 36 can be a more secure network than the network 46. The computing device 42 can store the communication from the user. When the user arrives at the ATM 10, the computing device 42 can transmit at least part of the communication to the ATM 10 for quicker completion of the transaction.

Figure 3:
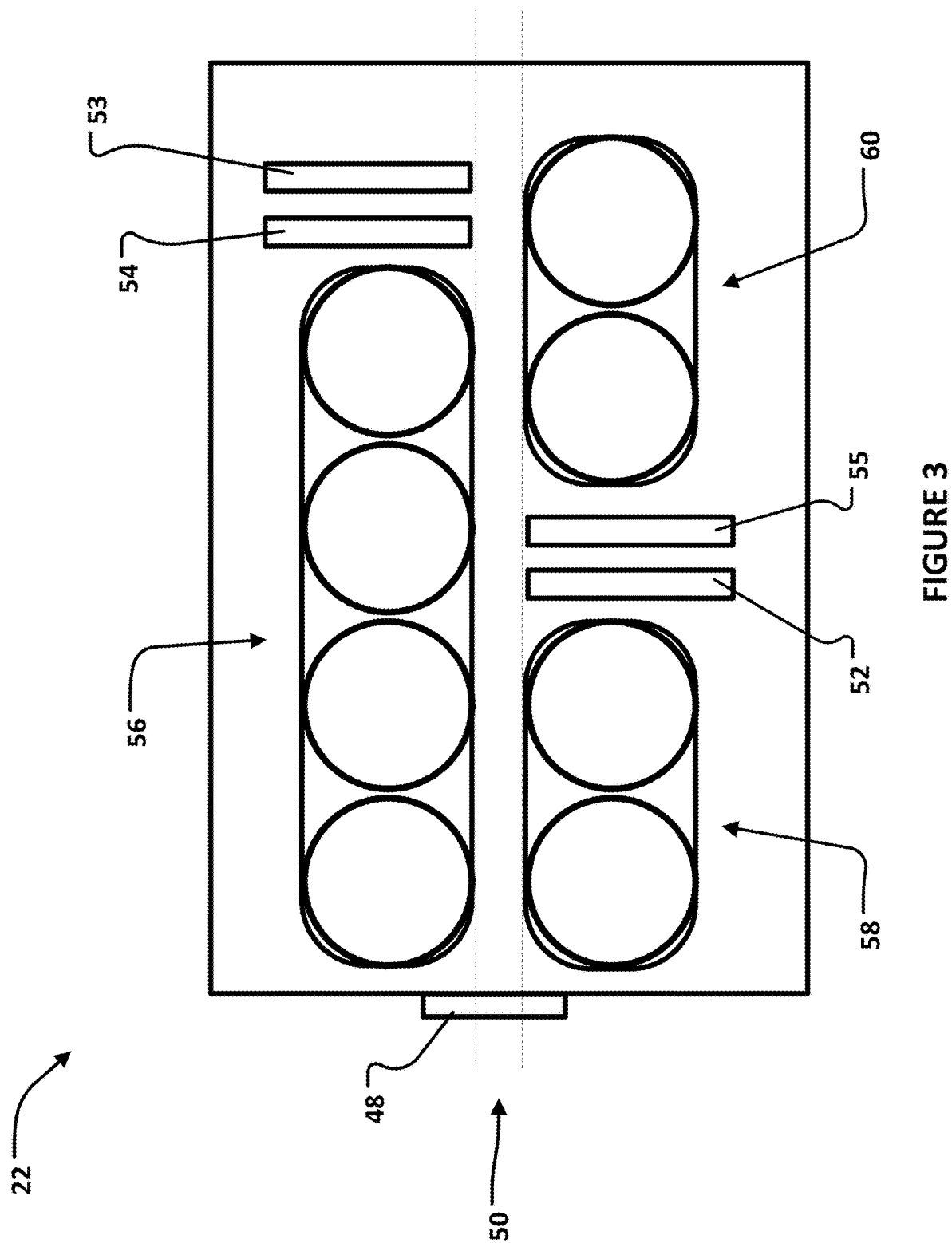
FIG. 3 is a schematic diagram of an exemplary card module according to one or more implementations of the present disclosure.

FIG. 3 is a schematic diagram of the exemplary card module 22. The card module 22 is exemplary and shown schematically; embodiments of the present disclosure can be practiced with card modules configured differently. The exemplary card module 22 includes an intake 48 exposed on the front face of the ATM 10. The user can insert a card in the intake 48. The card module 22 defines a path of movement of the card, referenced by spaced, dash lines at 50. The exemplary card module 22 also includes a plurality of conveyor members 56, 58, 60 configured to move the card along the path 50.

The exemplary card module 22 also includes card readers 52, 53. The card reader 52 is positioned along the path 50 and configured to read data held on a magnetic strip on an underside of the card. The card reader 53 is positioned along the path 50 and configured to read data held on a chip embedded in the card.

The exemplary card module 22 also includes optical scanners 54, 55. The optical scanner 54 is positioned along the path 50 and configured to capture an image of a top side of the card. The optical scanner 55 is positioned along the path 50 and configured to capture an image of a bottom side of the card. The card readers 52, 53 and the optical scanners 54, 55 communicate with the computing device 12. The card readers 52, 53 and the optical scanners 54, 55 are configured to transmit sensed conditions to the computing device 12. The card reader 52 is configured to transmit the detected account data stored on the magnetic strip of the card to the computing device 12. The optical scanner 54 is configured to transmit captured image(s) to the computing device 12. The computing device 12 can be configured to transmit data received from the card readers 52, 53 and the optical scanners 54, 55 to the computing device 42 to enhance authentication of the user.

Figure 4:
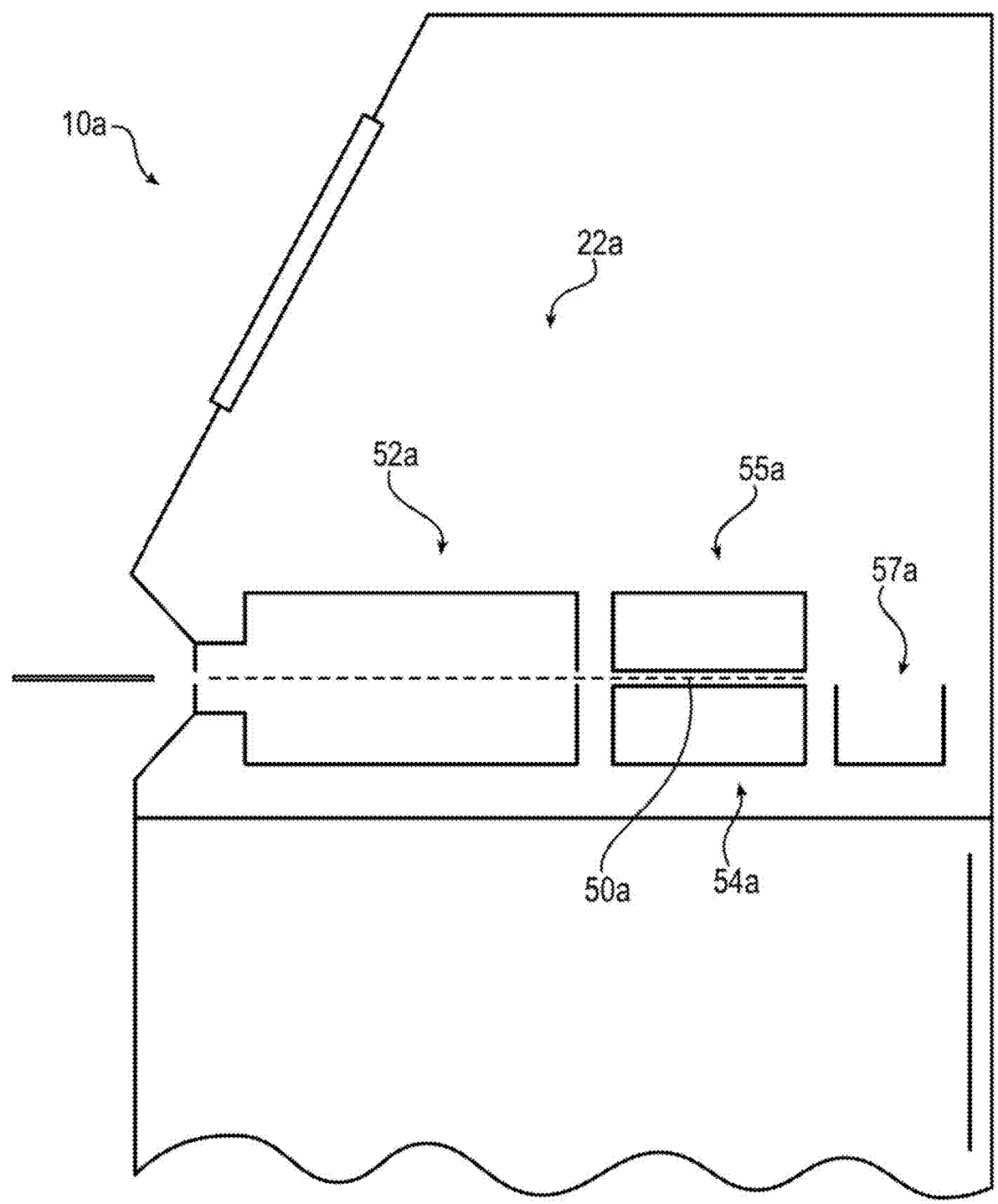
FIG. 4 is a functional block diagram of a second exemplary card module according to one or more implementations of the present disclosure.

In the embodiment shown in FIG. 3, the card readers 52, 53 and the optical scanners 54, 55 are part of an integrally-housed card module 22. FIG. 4 is a functional block diagram of a second exemplary card module according to one or more implementations of the present disclosure. In the embodiment shown in FIG. 4, a card module 22a includes a card reader 52a and the optical scanner 54a that are distinct assemblies and positioned adjacent to one another along a path 50a of movement of a card. The card module 22a also includes an optical scanner 55a to capture images of a top side of a card and a bin 57a to retain cards that cannot be returned to the person who inserted the card in the ATM 10a.

The exemplary optical scanner 54 and/or 55 can be configured to capture a full-color image of a card received by the card reader 22. The exemplary optical scanner 54 and/or 55 can be configured to emit ultraviolet (UV) radiation and capture images of indicia that becomes visible when subjected to UV radiation. The exemplary optical scanner 54 and/or 55 can be configured to emit infrared (IR) radiation and capture images of indicia that becomes visible when subjected to IR radiation. Emitters of radiation (visible light, UV, IR) can be components of the ATM 10 that are distinct from the optical scanner 54 and/or 55. The exemplary optical scanner 54 and/or 55 can be configured to capture and read single dimension bar codes, two-dimensional bar codes, and/or QR codes. The exemplary optical scanner 54 and/or 55 can be configured to capture and read indicia in the form of microprint. An Access-IS model ADR100 is one examples of an optical scanner that can be utilized in one or more embodiments of the present disclosure.

Figure 8:
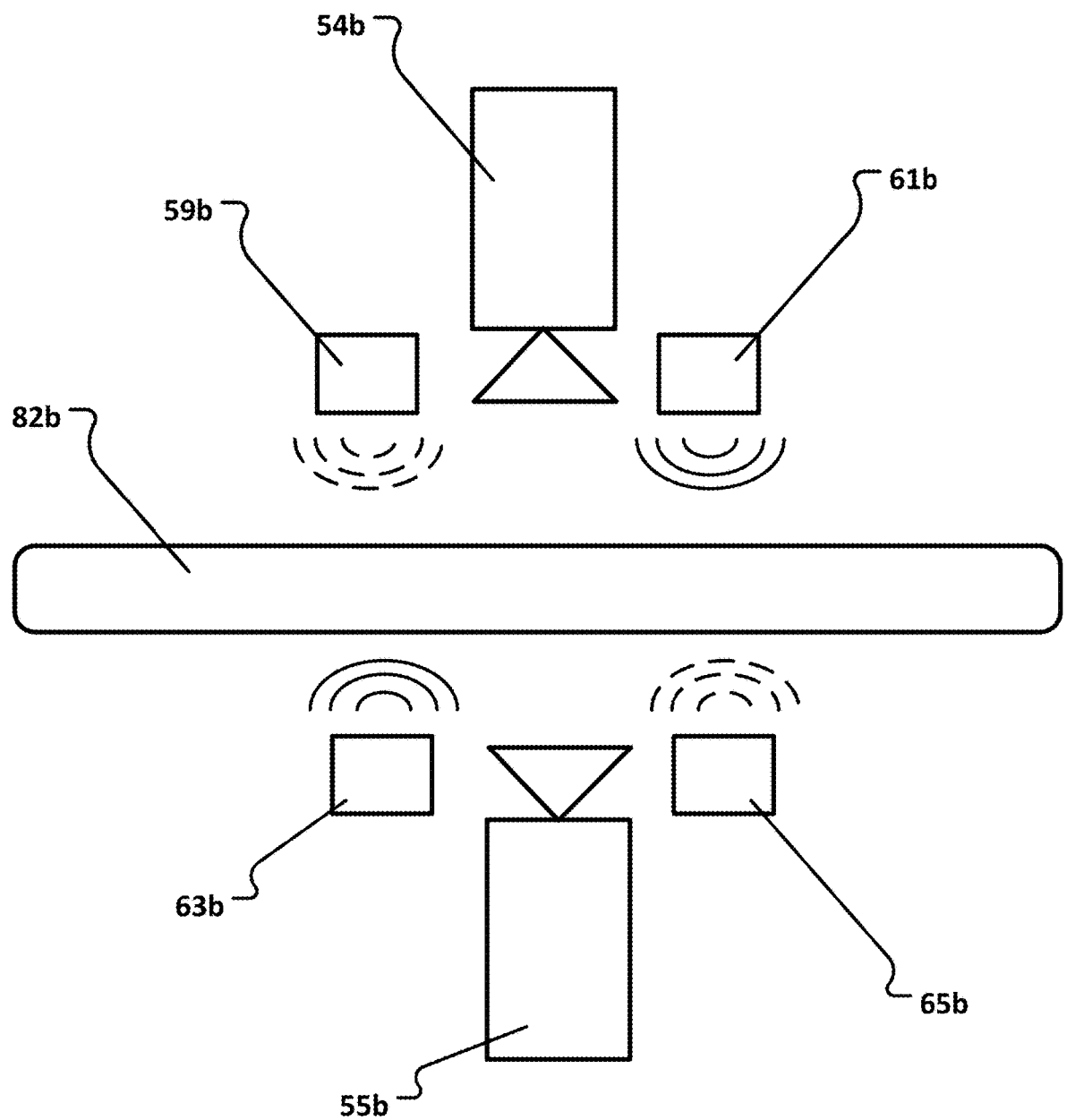
FIG. 8 is a first schematic of two optical scanners positioned to capture images from opposite sides of a card.

The exemplary optical scanner 54 and/or 55 can be configured to capture images of holograms defined on a card. One or more embodiments of the present disclosure can include a plurality of radiations sources that are engage in alternating pattern to reveal a hologram on a card. For example, in FIG. 8, optical scanners 54b, 55b are directed at opposite sides of a card 82b. Light emitting diodes (LEDs) 59b, 61b, 63b, 65b can be energized to project light on the card 82b. The LED 59b can be energized (emanating light in solid line) while the LED 61b is not energized and the optical scanner 54b can capture a first image. Next, LED 61b can be energized while the LED 59b is deenergized and the optical scanner 54b can capture a second image. Confirmation that the card is legitimate can then be determined by analysis of the first and second images. Similarly, the LED 63b can be energized while the LED 65b is not energized and the optical scanner 55b can capture a first image. Next, LED 65b can be energized while the LED 63b is deenergized and the optical scanner 54b can capture a second image.

Figure 9:
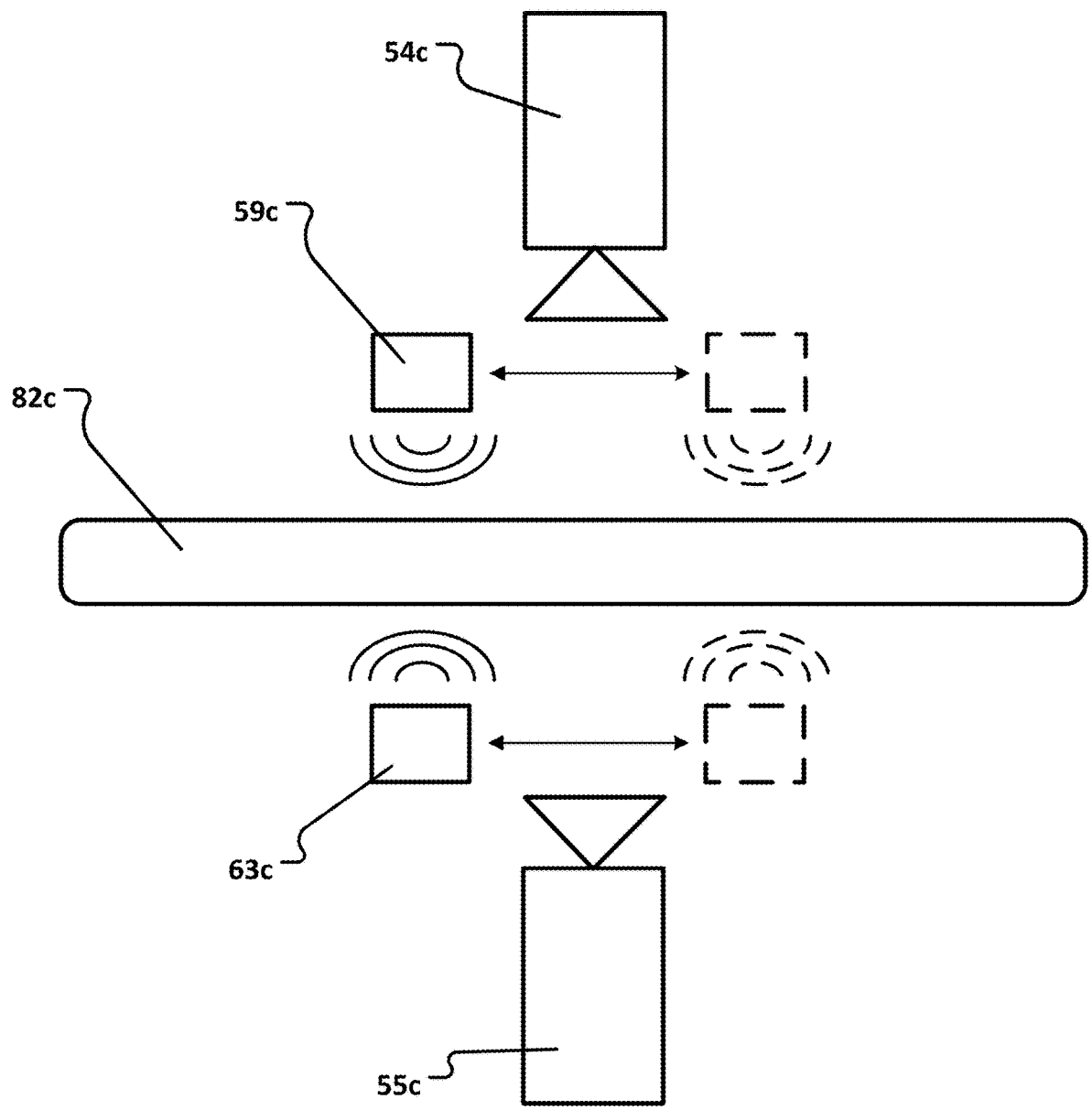
FIG. 9 is a second schematic of two optical scanners positioned to capture images from opposite sides of a card.

A moveable radiation source or multiple radiation sources can be included and operated in cooperation with the exemplary optical scanner 54 and/or 55 to capture an image of the card in order to enhance security. For example, in FIG. 9, optical scanners 54c, 55c are directed at opposite sides of a card 82c. Light emitting diodes (LEDs) 59c and 63c can be energized to project light on the card 82c. The exemplary LEDs 59c and 63c are moveable to direct radiation at the card 82c from first and second positions. The exemplary LEDs 59c, 63c are shown in solid line in the first position in FIG. 9 and in dash line in the second position. In one or more other embodiments, the optical scanner 54 and/or 55 may be configured to move to capture different images of holographic indicia.

Figure 5:
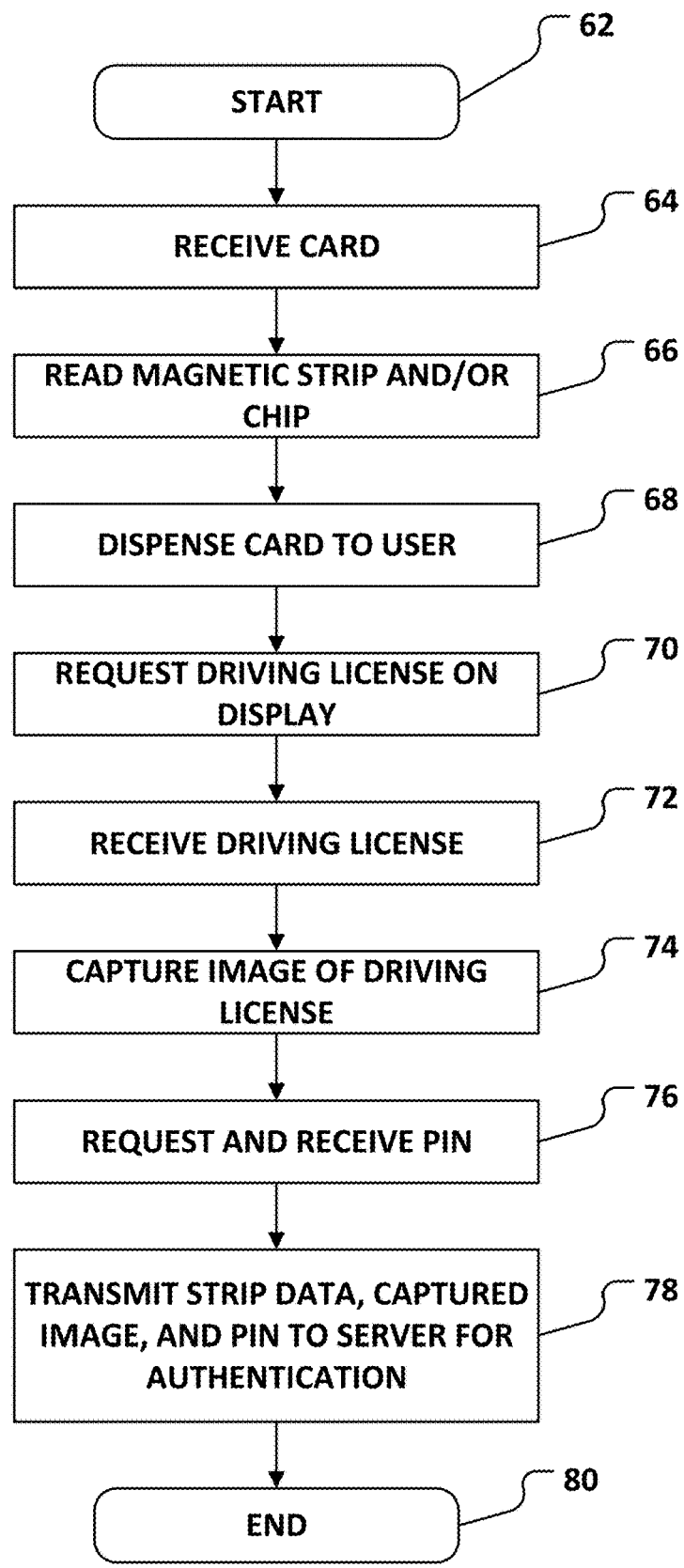
FIG. 5 is a flow diagram of an exemplary method executed by an ATM according to one or more implementations of the present disclosure.

FIG. 5 is a flow diagram of an exemplary method executed by an ATM, such as ATM 10, according to one or more implementations of the present disclosure. The method starts at 62. At 64, the ATM 10 receives a bank card, such as through the intake 48 of the card module 22. The computing device 12 controls the conveyor members 56, 58, 60 to move the card along the path 50 past the card reader 52. At 66, the card reader 52 reads the data on the magnetic strip on the back of the card as the card moves along the path 50. If the card has a chip, 66 can also include reading data from the chip with the card reader 53. At 68, the ATM 10 dispenses the card back to the user. At 70, the computing device 12 can control the display 14 to request the user to input the user's driving license in the card module 22. At 72, the ATM 10 receives the user's driving license in the card module 22. The computing device 12 controls the conveyor members 56, 58, 60 to move the driving license along the path 50 to the field of vision of the optical scanners 54, 55. At 74, the optical scanner 54 captures an image of the front of the driving license when the driving license is in the field of vision of the optical scanner 54. If the license is submitted "upside down," the image can be captured by the optical scanner 55 at 74. While not displayed in the flow diagram, the ATM 10 can eject the driving license after 74. At 76, the ATM 10 requests and receives the personal identification number (PIN) of the user. The request can be presented on the display 14 and the PIN can be received through the EPP (16 and 18). At 78, the computing device 12 transmits the data read by the card reader(s) 52 and/or 54, the image captured by the optical scanner(s) 54 and/or 55, and the PIN to the server 42 for authentication of the user and permission to complete the transaction requested by the user. The illustrated process ends at 80, but the actual interaction with the user could end with the completion of a transaction or the rejection of the proposed transaction, such as a dispensation of bank notes or the intake of a bank check for example.

Figure 6:
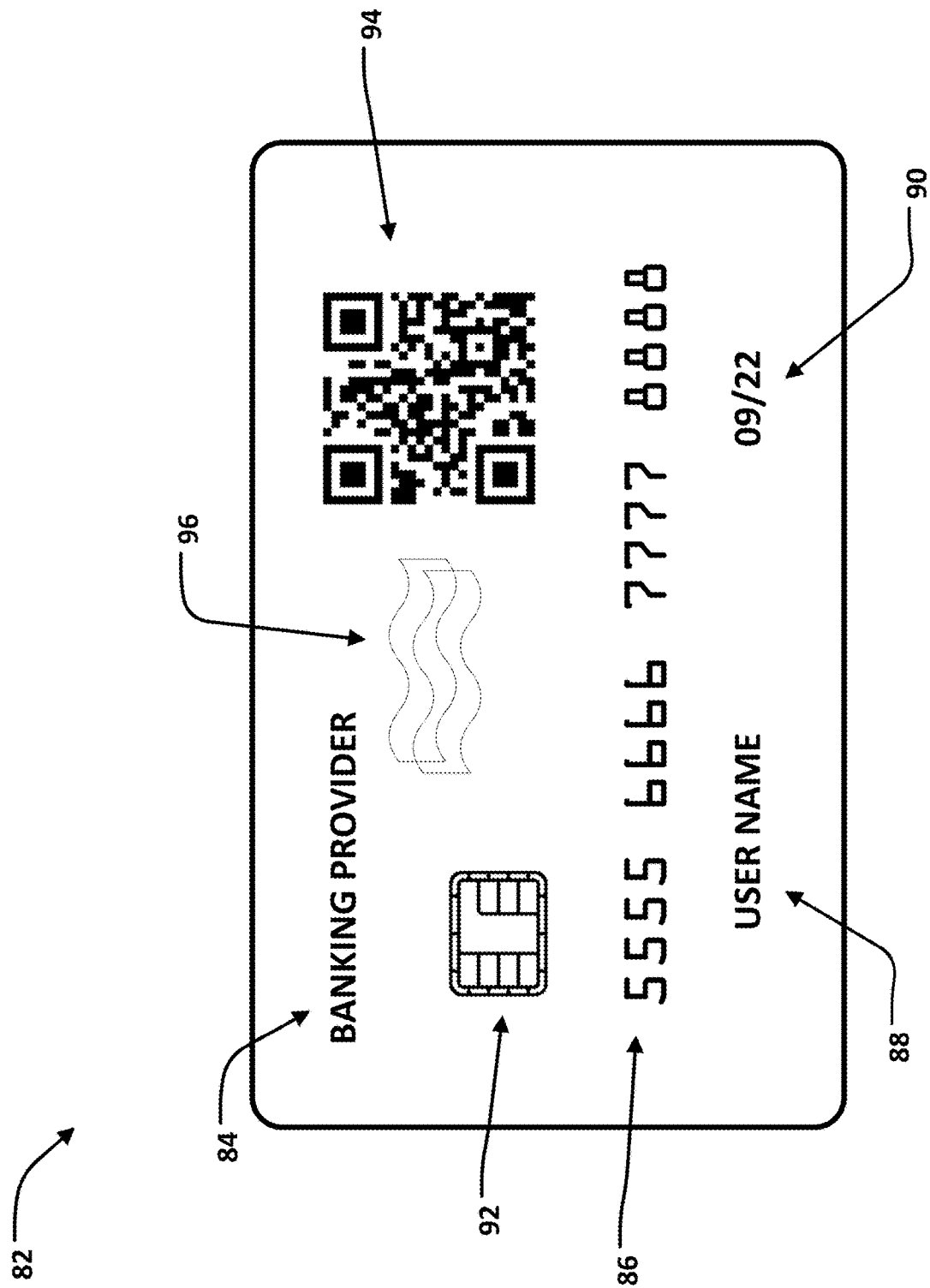
FIG. 6 is a front view of an exemplary bank card.

FIG. 6 is a front view of an exemplary bank card 82. The exemplary bank card 82 displays various indicia. Indicia 84 is the name of the issuer of the card. Indicia 86 is an account number. Indicia 88 is the card holder's name. Indicia 90 is the date of expiration of the bank card. The exemplary bank card 82 also includes an integrated circuit or chip 92, storing information. The exemplary bank card 82 also includes indicia 94 in the form a QR code. The exemplary bank card 82 also includes a magnetic strip on the back, which is therefore not visible. The exemplary bank card 82 also includes a holographic indicia 96.

Figure 7:
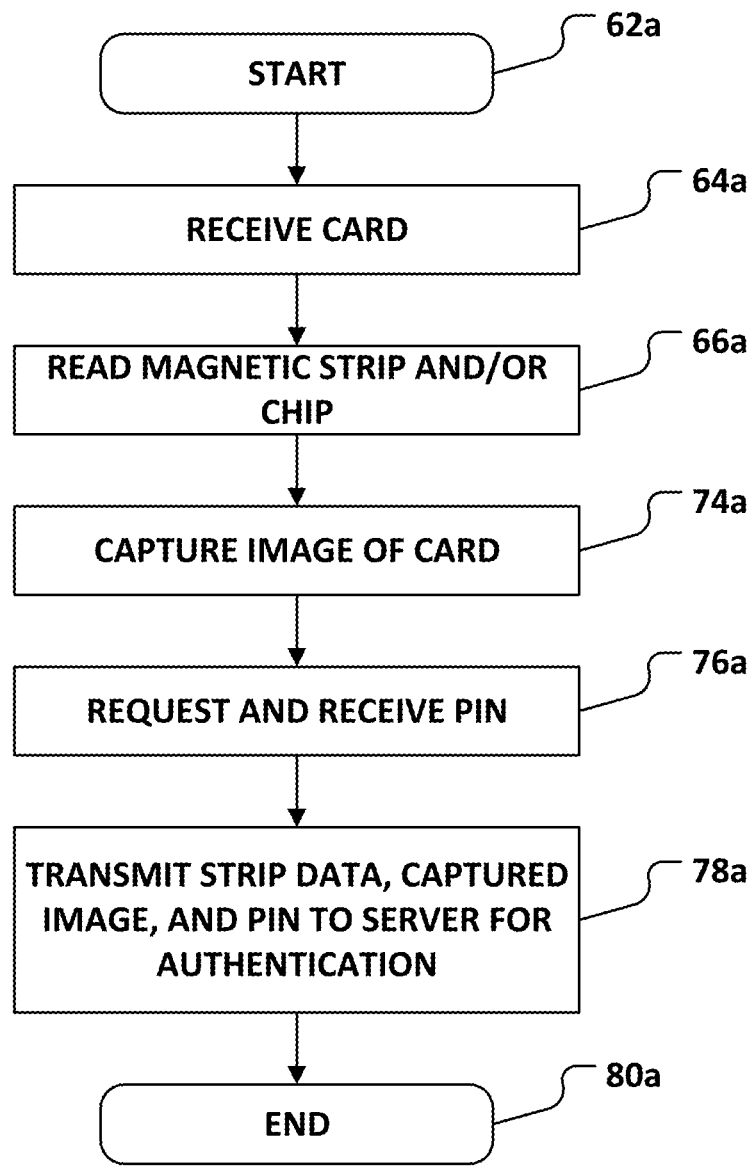
FIG. 7 is a flow diagram of a second exemplary method executed by an ATM according to one or more implementations of the present disclosure.

FIG. 7 is a flow diagram of a second exemplary method that can be executed by an ATM such as ATM 10 according to one or more implementations of the present disclosure. The flow diagram of the second exemplary method can be executed with the exemplary bank card 82. The method starts at 62a. At 64a, the ATM 10 receives the bank card 82, such as through the intake 48 of the card module 22. The computing device 12 controls the conveyor members 56, 58, 60 to move the card along the path 50 past the card reader 52. At 66a, the card reader 52 reads the data on the magnetic strip on the back of the card as the card moves along the path 50. If the card has a chip, 66a can also include reading data from the chip with the card reader 53. The computing device 12 can continue to control the conveyor members 56, 58, 60 to move the bank card 82 along the path 50 to the field of vision of the optical scanner 54. At 74a, the optical scanner 54 captures an image of the front of the bank card 82 when the bank card 82 is in the field of vision of the optical scanner 54. The optical scanner 54 can be positioned in particular to capture an image of the QR code 94. If the license is submitted "upside down," the image can be captured by the optical scanner 55 at 74. At 76a, the ATM 10 requests and receives the personal identification number (PIN) of the user. The request can be presented on the display 14 and the PIN can be received through the EPP (16 and 18). At 78a, the computing device 12 transmits the data read by the card reader(s) 52 and/or 53, the image(s) captured by the optical scanner(s) 54 and/or 55, and the PIN to the server 42 for authentication of the user and permission to complete the transaction requested by the user. The illustrated process ends at 80*a*, but the actual interaction with the user could end with the completion of a transaction or the rejection of the proposed transaction, such as a dispensation of bank notes or the intake of a bank check for example.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or sub-combinations that are disclosed herein is hereby unconditionally reserved. The use of the word "can" in this document is not an assertion that the subject preceding the word is unimportant or unnecessary or "not critical" relative to anything else in this document. The word "can" is used herein in a positive and affirming sense and no other motive should be presumed. More than one "invention" may be disclosed in the present disclosure; an "invention" is defined by the content of a patent claim and not by the content of a detailed description of an embodiment of an invention.

What is claimed is:

1. A self-service terminal comprising:
   a computing device having one or more processors;
   a display in communication with said computing device wherein indicia displayed by said display is controlled by said computing device;
   a transceiver in communication with said computing device wherein said computing device is configured to transmit data remotely through said transceiver and to receive data through said transceiver;
   a card module having an intake configured to receive a card and at least one card reader configured to read one of a chip embedded in the card and a magnetic strip of the card, wherein at least part of a path of movement of the card through said self-service terminal is defined by said card module;
   at least one optical scanner for image capture positioned on a first side of said path of movement to capture an image of a first side of the card; and
   at least one radiation source on the first side of said path of movement directed at the first side of the path and configured to emit radiation at an area of the card when the image is being captured;
   where the at least one card reader and the at least one optical scanner are one of:
      integrally-housed in the card module, and
      distinct assemblies positioned adjacent to one another along the path of movement of the card.

2. The self-service terminal of claim 1 wherein said at least one radiation source is moveable relative to said path from a first position to a second position, where said at least one optical scanner captures the image of the first side of the card when said at least one radiation source is in the first position, and where said at least one optical scanner captures an other image of the first side of the card when said at least one radiation source is in the second position.

3. The self-service terminal of claim 1 wherein:
   said at least one optical scanner is further defined as a first optical scanner positioned on the first side of said path to capture the image of the first side of the card and a second optical scanner positioned on a second side of said path opposite the first side of said path to capture an image of a second side of the card opposite the first side of the card; and
   said at least one radiation source is further defined as a first radiation source on the first side of said path of movement directed at the first side of the path and a second radiation source on a second side of said path of movement directed at the second side of the path.

4. The self-service terminal of claim 1 wherein said at least one radiation source is further defined as configured to emit visible light, and where the at least one optical scanner is configured to capture a full color image.

5. The self-service terminal of claim 1 wherein said at least one radiation source is further defined as configured to emit ultraviolet light, and where the at least one optical scanner is configured to capture an image of indicia that becomes visible when subjected to the ultraviolet light.

6. The self-service terminal of claim 1 wherein said at least one radiation source is further defined as configured to emit infrared light, and where the at least one optical scanner is configured to capture an image of indicia that becomes visible when subjected to the infrared light.

7. The self-service terminal of claim 1 wherein said at least one radiation source is further defined as:
   a first radiation source directed at the first side of the path and positioned on a first side of the first optical scanner; and
   a second radiation source directed at the first side of the path and positioned on a second side of the first optical scanner opposite the first side of the optical scanner whereby the first optical scanner is positioned between said first radiation source and said second radiation source.

8. The self-service terminal of claim 1 wherein said at least one radiation source is further defined as:
   a plurality of radiation sources controlled by said computing device and configured to respectively emit light at one or more areas of the card when said at least one optical scanner is capturing the image of the first side of the card.

9. The self-service terminal of claim 1 wherein said at least one radiation source is further defined as:
   a first radiation source on the first side of said path of movement directed at the first side of the path of movement of the card; and
   a second radiation source on a second side of said path of movement directed at the second side of the path of movement of the card, wherein both of said first radiation source and said second radiation source are moveable relative to the path.

10. The self-service terminal of claim 1 wherein said at least one optical scanner is further defined as first and second optical scanners spaced from one another along said path.

11. A method performed by a self-service terminal comprising:
    controlling, with a computing device of the self-service terminal having one or more processors, a display in communication with the computing device, to display indicia on the display of the self-service terminal;
    transmitting, with a transceiver in communication with the computing device, data remotely from the self-service terminal;

receiving, with the computing device, data through the transceiver;

receiving a card through an intake of a card module of the self-service terminal;

reading at least one of a chip embedded in the card and a magnetic strip of the card with at least one card reader of the card module;

defining at least part of a path of movement of the card through the self-service terminal with the card module;

emitting radiation at an area of a first side of the card with at least one radiation source on a first side of said path of movement directed at the first side of the path of movement; and capturing an image of the first side of the card with at least one optical scanner for image capture positioned on the first side of the path of movement during said emitting;

where the at least one card reader and the at least one optical scanner are one of:
integrally-housed in the card module, and
distinct assemblies positioned adjacent to one another along the path of movement of the card.

12. The method of claim 11 further comprising:
moving the at least one radiation source relative to said path to direct radiation at the card from first and second positions that are different from one another, where the capturing of the image of the first side of the card with at least one optical scanner is when said at least one radiation source is in the first position, and
capturing an other image of the first side of the card with said at least one optical scanner when said at least one radiation source is in the second position.

13. The method of claim 11 further comprising:
emitting radiation at an area of a second side of the card with at least one radiation source on a second side of said path of movement directed at the second side of the path of movement; and
capturing an image of the second side of the card opposite the first side of the card with at least one optical scanner positioned on a second side of the path of movement opposite the first side of the path of movement during said emitting radiation at the area of the second side of the card.

14. The method of claim 11 wherein said emitting is further defined as:
emitting radiation in the form of visible light at the area of the first side of the card with the at least one radiation source directed at the first side of the path, where the image captured by the at least one optical scanner is a full color image.

15. The method of claim 11 wherein said emitting is further defined as:
emitting radiation in the form of ultraviolet light at the area of the first side of the card with the at least one radiation source directed at the first side of the path, where the image captured by the at least one optical scanner is of indicia that becomes visible when subjected to the ultraviolet light.

16. The method of claim 11 wherein said emitting is further defined as:
emitting radiation in the form of infrared light at the area of the first side of the card with the at least one radiation source directed at the first side of the path, where the image captured by the at least one optical scanner is of indicia that becomes visible when subjected to the infrared light.

17. The method of claim 11 further comprising:
moving the at least one radiation source relative to the path of movement from a first position to a second position after said emitting radiation at the area of the first side of the card with the at least one radiation source;
emitting radiation at the area of the first side of the card from the second position with the at least one radiation source directed at the first side of the path of movement after said moving; and
capturing a second image of the first side of the card with the at least one optical scanner positioned on the first side of the path of movement during said emitting radiation at the second area of the first side of the card with the at least one radiation source.

18. The method of claim 11 further comprising:
emitting radiation at the area of the first side of the card with a second radiation source on the first side of said path of movement, that is distinct and physically spaced from the at least one radiation source; and
capturing a second image of the first side of the card with at least one optical scanner positioned on the first side of the path of movement during said emitting radiation at the area of the first side of the card with the second radiation source.

19. The method of claim 18 further comprising:
ceasing said emitting radiation at the area of the first side of the card with the at least one radiation source prior to said emitting radiation at the area of the first side of the card with the second radiation source.

20. The method of claim 11 wherein:
said emitting radiation is further defined as successively emitting radiation at the area of the first side of the card from a plurality of different positions; and
said capturing is further defined as capturing successive images of the first side of the card, at least one image captured for each of the plurality of different positions, with the at least one optical scanner.

\* \* \* \* \*